United States Patent [19]
Chaffee

[11] Patent Number: 6,132,599
[45] Date of Patent: Oct. 17, 2000

[54] MULTI-LAYER RECIRCULATING FILTER WASTEWATER TREATMENT APPARATUS

[75] Inventor: Kevin R. Chaffee, Batesville, Ind.

[73] Assignee: Earthtek Enviromental Systems, Inc., Batesville, Ind.

[21] Appl. No.: 09/309,047

[22] Filed: May 10, 1999

[51] Int. Cl.[7] ................................... B01D 35/00
[52] U.S. Cl. ............................ 210/86; 210/85; 210/104; 210/196; 210/197; 210/293; 210/291; 210/284; 210/416.1
[58] Field of Search ................................ 210/85, 86, 104, 210/109, 138, 143, 194, 196, 197, 266, 284, 291, 416.1, 290, 293, 283, 258, 260, 261, 195.1

[56] References Cited

U.S. PATENT DOCUMENTS

| | | |
|---|---|---|
| 2,366,917 | 1/1945 | Levine . |
| 3,123,555 | 3/1964 | Moore . |
| 3,126,333 | 3/1964 | Williams . |
| 3,825,119 | 7/1974 | Rost . |
| 3,933,641 | 1/1976 | Hadden et al. . |
| 3,957,642 | 5/1976 | Oldham et al. . |
| 4,100,070 | 7/1978 | White et al. . |
| 4,251,359 | 2/1981 | Colwell et al. . |
| 4,812,237 | 3/1989 | Cawley et al. . |
| 5,240,611 | 8/1993 | Burton . |
| 5,277,814 | 1/1994 | Winter et al. . |
| 5,480,561 | 1/1996 | Ball et al. . |
| 5,531,894 | 7/1996 | Ball et al. . |
| 5,597,477 | 1/1997 | Harry, III . |
| 5,609,754 | 3/1997 | Stuth . |
| 5,645,725 | 7/1997 | Zitzelsberger et al. . |
| 5,690,827 | 11/1997 | Simmering et al. . |
| 5,707,513 | 1/1998 | Jowett et al. . |

*Primary Examiner*—W. L. Walker
*Assistant Examiner*—Terry K. Cecil
*Attorney, Agent, or Firm*—Bose McKinney & Evans LLP

[57] ABSTRACT

A wastewater treatment unit (10) includes a recirculation chamber (32), a dosing chamber (34) having no direct fluid connection to the recirculation chamber, and at least two filter layers (28,30) in a single tank (12). Each filter layer contains filter media (56) and is located atop the recirculation and dosing chambers. The wastewater treatment unit also includes an influent pipe (50) connected to the recirculation chamber, a recirculation pump (72), a recirculation valve (74), and an effluent discharge pipe (88) connected to the dosing chamber. In operation, the influent pipe directs wastewater entering the unit into the recirculation chamber. The recirculation pump feeds wastewater from the recirculation chamber onto the filter layers. The recirculation valve then directs the filtrate back to the recirculation and dosing chambers. The filtrate is then discharged from the unit via the effluent discharge pipe. A control system is also provided that includes a level control for the chambers and an over-amperage alarm for the recirculating pump and a ponding alarm for alerting when ponding of water is detected on either of the filter layers.

24 Claims, 4 Drawing Sheets

MULTI-LAYER RECIRCULATING FILTER WASTEWATER TREATMENT APPARATUS

FIELD OF THE INVENTION

This invention relates to wastewater treatment systems and improvements thereto. More particularly, this invention relates to an apparatus for treatment of primary effluent from residential and commercial establishments to allow subsurface or surface disposal of wastewater therefrom.

BACKGROUND OF THE INVENTION

Many areas in this country are experiencing an increase in population accompanied by a larger demand for housing and commercial establishments in rural areas and around major municipalities with no access to a public sewer system. Conventional onsite wastewater systems provide a viable option for managing the wastewater generated by development, however, not all soils are suitable for these systems. Conventional onsite wastewater systems also require a large land area, putting a premium cost on real estate in many locations. In order to maintain a non-hazardous environment, residential and commercial establishments must treat wastewater that they produce. Since public utility wastewater treatment systems and conventional onsite systems are not always available or are not desirable, alternative wastewater treatment methods are often necessary. Due to the premium price on real estate and the high density of residential and commercial building, it is desirable to reduce and minimize the space required for wastewater treatment systems to treat the wastewater to acceptable standards.

Single layer recirculating media filters are currently available as site-built systems utilizing separate structures for recirculation basins, filters and dosing tanks. These distributed systems need large areas for treating wastewater to acceptable standards and require knowledgeable, trained, designers and installers. Intermittent (single pass) filter media systems are also available as site-built systems, however, they require up to five times more area and typically do not attain the level of treatment of recirculating media filter systems.

The level of treatment a system can achieve is directly related to the surface area of filter media available to the system and the number of times that the wastewater is passed through the available filter media.

Accordingly, a need exists for a wastewater treatment system that can treat wastewater to acceptable standards, does not require a large amount of ground area, and can be installed using simple construction techniques.

SUMMARY OF THE INVENTION

The present invention is a self contained wastewater treatment unit designed to reduce the levels of biochemical oxygen demand, total suspended solids, ammonia, nitrates, and pathogens in the influent to the wastewater treatment unit. The wastewater treatment unit preferably follows a septic tank or other system which provides primary treatment which includes separation of solids from the liquid portion of the wastewater. The wastewater treatment unit will treat the influent wastewater to allow subsurface or surface disposal of the treated effluent wastewater. The effluent from the wastewater treatment unit can be disposed of using conventional gravel distribution trenches, subsurface drip irrigation, or surface discharge depending on the local regulations.

A wastewater treatment unit according to the present invention includes a recirculation chamber, a dosing chamber having no direct fluid connection to the recirculation chamber, and at least two filter layers in a single tank. Each filter layer containing filter media and being located atop the recirculation and dosing chambers. The wastewater treatment unit also including an influent pipe, a recirculation pump located in the recirculation chamber, a recirculation valve, an optional dosing pump in the dosing chamber, and an effluent discharge pipe connected to the dosing chamber. The influent pipe directs wastewater entering the wastewater treatment unit into the recirculation chamber, the recirculation pump pumps the wastewater from the recirculation chamber onto the filter layers; the wastewater flows through the filter media of the filter layers and is directed to the recirculation valve; the recirculation valve directs the wastewater to the recirculation or the dosing chamber; and the wastewater is discharged from the wastewater treatment unit through the dosing pump and effluent discharge pipe.

One advantage of the present invention is that it has multiple layers of aerobic filter media in a single structural tank. The multiple filter media layers reduce the footprint necessary for the wastewater treatment system by a factor of the number of layers in the unit. A two-layer filter system requiring one-half the footprint of a single layer filter system; a three-layer filter system requiring one-third the footprint of a single layer filter system; and so-on.

Another advantage of the present invention is that it has separate recirculation and dosing chambers in a single structural tank. The separate recirculation and dosing chambers improve the level of treatment that can be achieved by the wastewater treatment unit.

Another advantage of the present invention is that it is a self-contained package unit assembled in a single tank. This package concept allows relatively unskilled contractors to install a complex treatment system without the need of professional engineering services.

Yet another advantage of the present invention is it allows for design standardization which can be used to simplify the regulatory approval process. The treatment capacity and footprint of the wastewater treatment unit being known allows for a known amount of ground space to be allocated to obtain the necessary wastewater treatment levels.

Additional objects, advantages and novel features of the invention are set forth in the description that follows, and will become apparent to those skilled in the art upon reviewing the drawings in connection with the following description.

DETAILED DESCRIPTION OF PREFERRED EMBODIMENTS OF THE INVENTION

Figure 1:
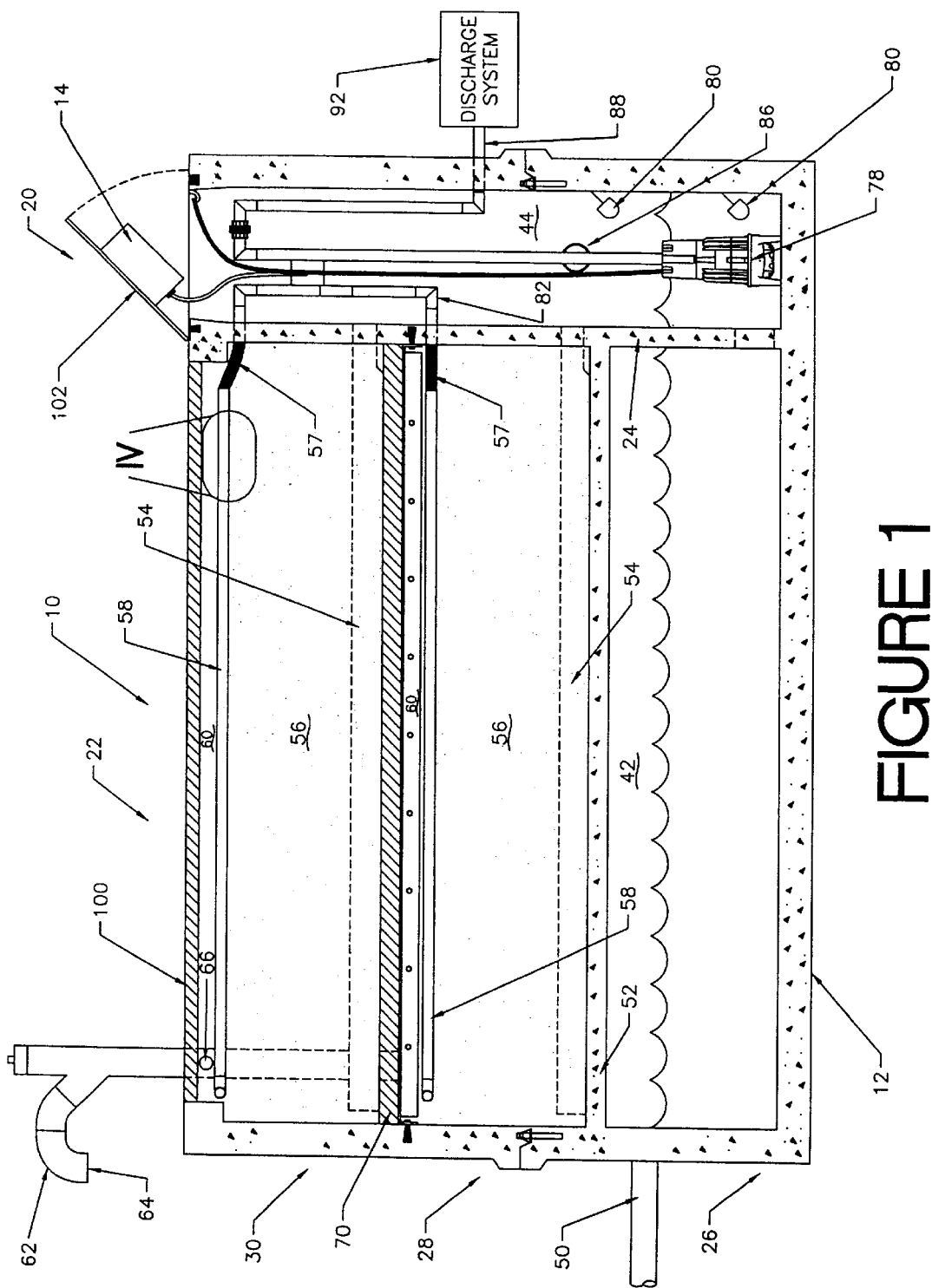
FIG. 1 is a side view of an embodiment of a wastewater treatment unit according to the present invention.

FIG. 1 shows an embodiment of a two filter layer wastewater treatment unit 10 which includes a tank 12. The tank 12 is made of a suitable material, such as concrete, polyethylene or steel. The tank 12 is divided into a pump section 20 and a filter section 22 by a pump wall 24 that is the height of the tank 12. The pump section 20 contains at least one pump which circulates the wastewater through the treatment unit 10. In the embodiment shown in FIG. 1, the filter section 22 is divided into three layers: a bottom layer 26, a first filter layer 28, and a second filter layer 30. A wastewater treatment unit according to the present invention can have more than two filter layers. A pump cover 102 covers the pump section 20 and a filter cover 100 covers the filter section 22.

Figure 2:
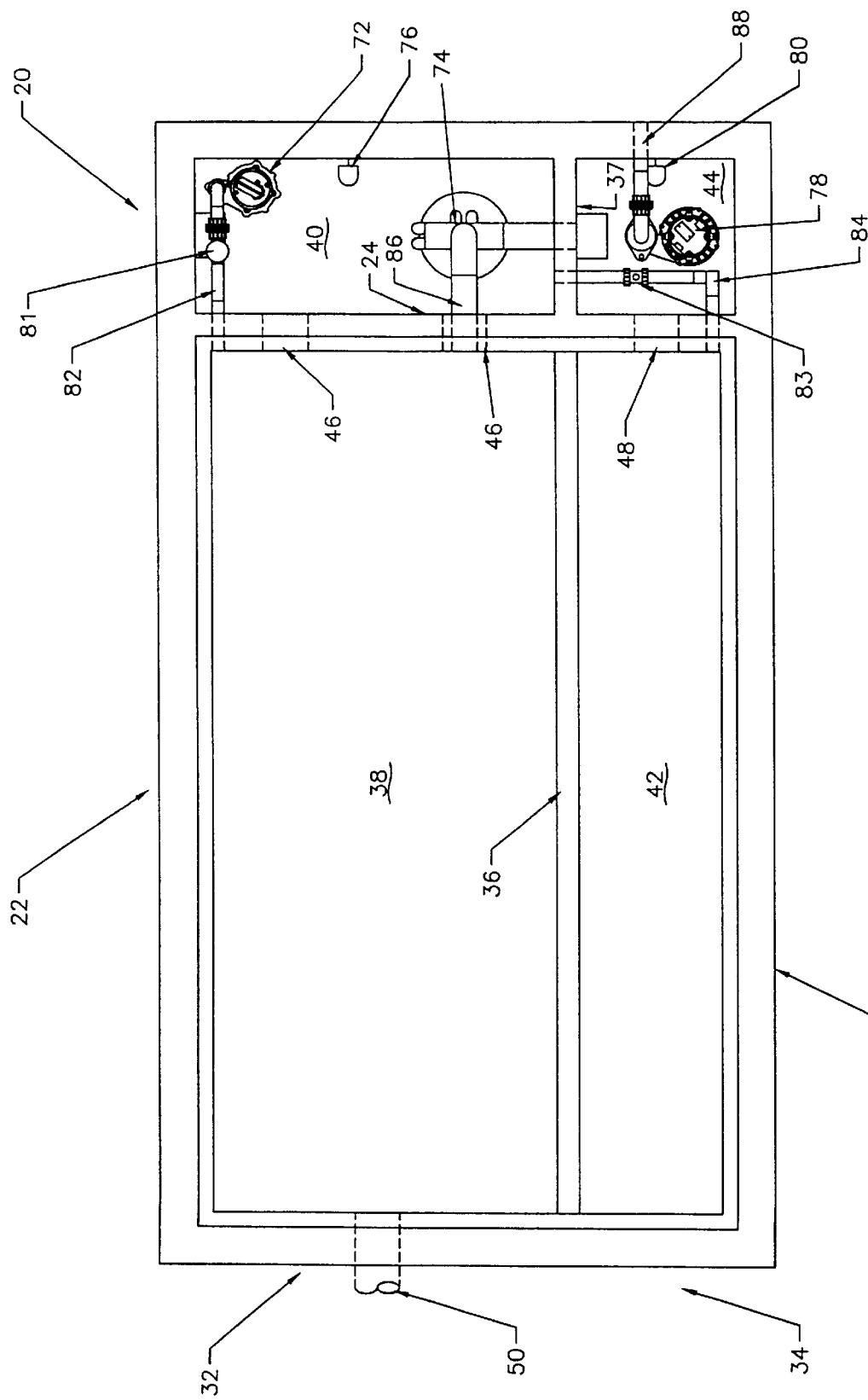
FIG. 2 is a plan view of the bottom layer of a wastewater treatment unit according to the present invention.

FIG. 2 provides a plan view of the bottom layer 26 of the wastewater treatment unit 10. The bottom layer 26 is divided into a recirculation chamber 32 and a dosing chamber 34 by a chamber wall 36 and a pump chamber wall 37. The chamber wall 36 is the height of the bottom layer 26 and the pump chamber wall 37 is the height of the tank 12. The recirculation chamber 32 and the dosing chamber 34 are not in direct fluid communication. The recirculation chamber 32 is divided into a recirculation basin 38 and a recirculation pump chamber 40 by the pump wall 24. Two recirculation conduits 46 provide fluid communication between the recirculation basin 38 and the recirculation pump chamber 40. The dosing chamber 34 is divided into a dosing basin 42 and a dosing pump chamber 44 by the pump wall 24. A dosing conduit 48 provides fluid communication between the dosing basin 42 and the dosing pump chamber 44. Each of the recirculation and dosing conduits 46, 48 are formed by holes in the pump wall 24 which are preferably lined with a PVC sleeve. Wastewater enters the wastewater treatment unit 10 through an influent pipe 50 which empties into the recirculation chamber 32.

The recirculation pump chamber 40 and the dosing pump chamber 44 extend from the bottom layer 26 of the tank 12 to the pump cover 102 and are separated by the pump chamber wall 37. The recirculation pump chamber 40 contains a recirculation pump 72, a recirculation valve 74 and a recirculation basin level control 76. The dosing pump chamber 44 contains a dosing pump 78 and a dosing basin level control 80.

Figure 3:
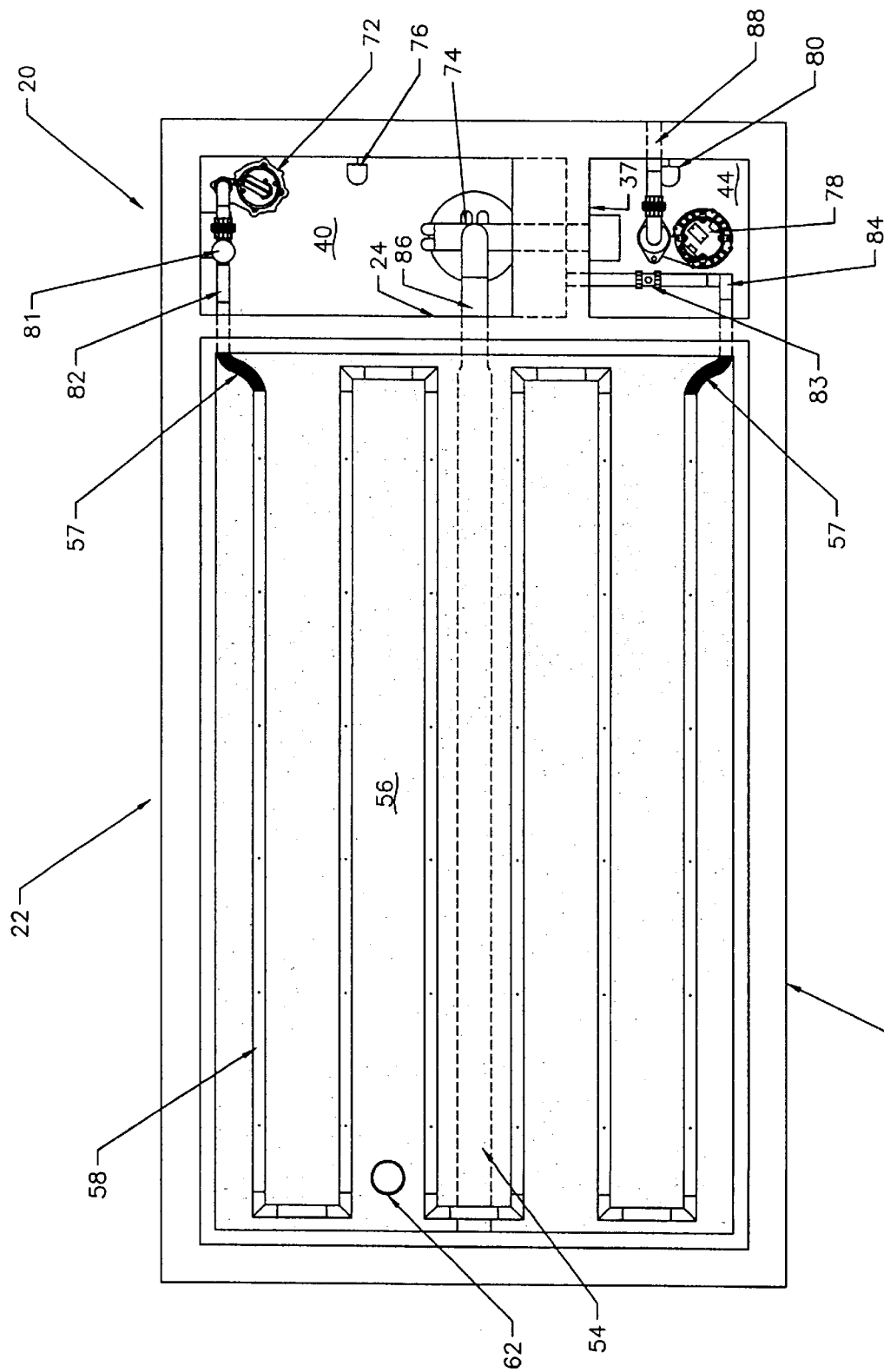
FIG. 3 is a plan view of a filter layer of a wastewater treatment unit according to the present invention.

FIG. 3 shows a plan view of a filter layer which can be one of the first and second filter layers 28, 30. Each of the first and second filter layers 28, 30 includes an underdrain piping 54, a layer of filter media 56, a filter lateral piping 58 and an air space 60. A first filter layer floor 52 defines the bottom of the first filter layer 28. The first filter layer floor 52 may be removable or permanent. The first filter layer floor 52 prevents direct fluid communication between the first filter layer 28 and the bottom layer 26. A second filter layer floor 70 defines the bottom of the second filter layer 30. The second filter layer floor 70 and the floor of any additional filter layers are removable. The removable floors of the upper filter layers provide access to the lower filter layers for maintenance of the filter media layers 56 and other components of the lower filter layers.

A vent pipe 62 extends from the first filter layer 28 outside the tank 12 and into the atmosphere. The vent pipe 62 has an outside vent opening 64 which is open to air. The outside vent opening 64 is preferably downward facing and screened to allow air to pass into and out of the vent pipe 62 without allowing precipitation, animals and debris from entering the vent pipe 62. The vent pipe 62 has an opening 66 to the air space 60 of each filter layer 28, 30 to provide fluid communication between each air space 60 and the outside atmosphere.

Figure 4:
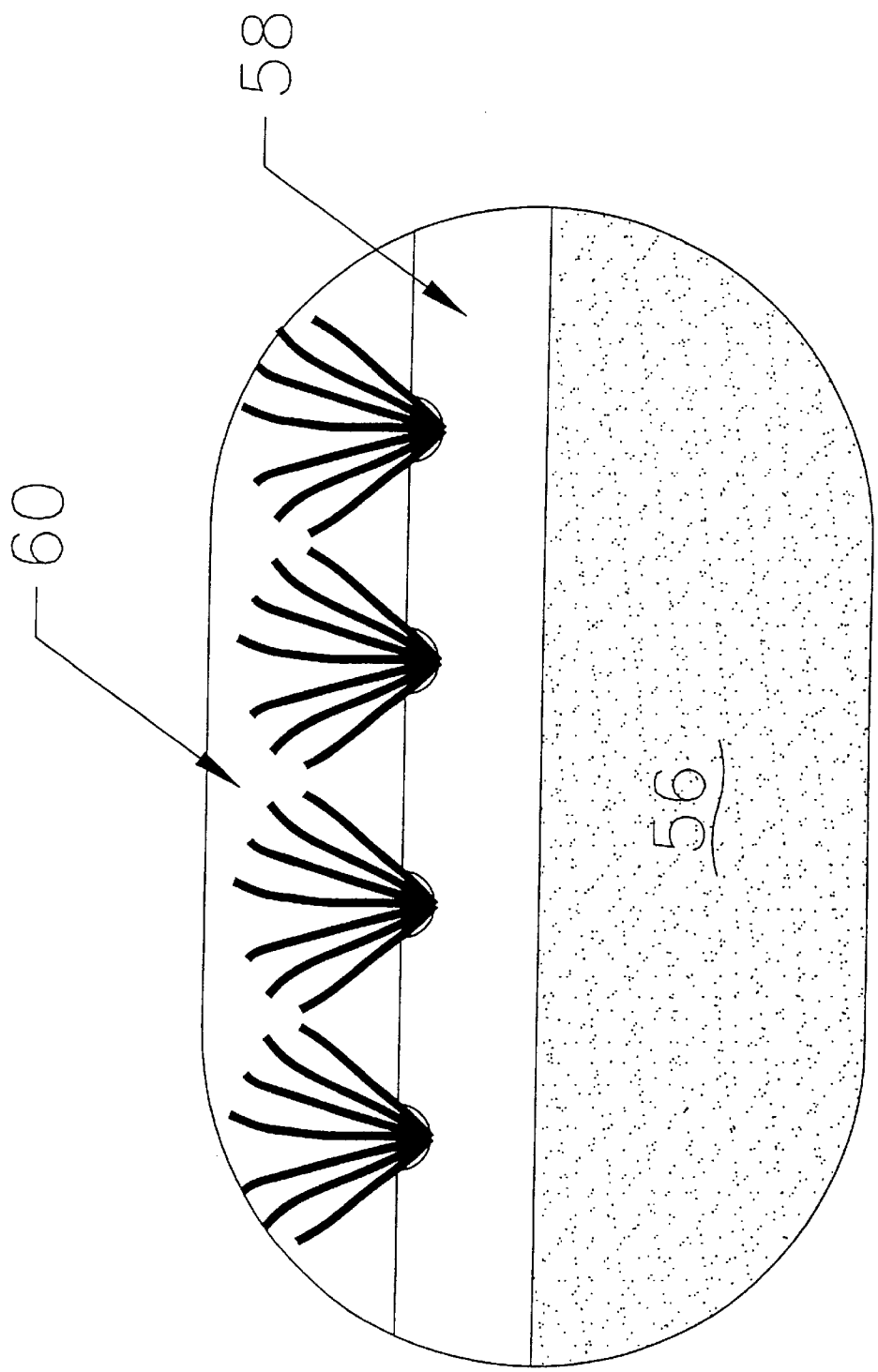
FIG. 4 is a view of a portion of FIG. 1 showing the discharge of wastewater over the filter layer.

The filter distribution piping 82 of each filter layer is connected to the recirculation pump 72. The recirculation pump 72, when activated, pumps wastewater from the recirculation chamber 32 into the filter distribution piping 82, through an automatic distributing device 81 which provides a constant flow to each filter level 28, 30, through wall 24 to a flexible hose 57 which is connected to the filter lateral piping 58, which distributes the wastewater over the filter media layer 56. A preferred configuration for the filter lateral piping 58 shown in FIG. 3 includes lateral pipe 58 which runs in a serpentine pattern over filter media 56. A flexible hose 57 connects to the end of filter lateral piping 58 and filter flush piping 84. Filter flush piping 84 runs through wall 24, through dosing pump chamber 44, through wall 37 and into recirculation basin 40. Valve 83 on filter flush piping 84 can be opened to flush the piping into recirculation basin 40. Each of the lateral pipes 58 in filter level 28, 30 includes multiple orifices through which the pumped wastewater is sprayed upward into air space 60. The upwardly sprayed wastewater is aerated in the air space 60 and showers over the filter media layer 56, as shown in FIG. 4.

The wastewater then seeps through the filter media 56 and flows into the underdrain piping 54. A preferred configuration for the underdrain piping 54 is a centrally located slotted pipe which is generally perpendicular to the pump wall 24. The slots of the underdrain piping 54 being large enough to allow the wastewater to enter the underdrain piping 54, but small enough to prevent the filter media from entering the underdrain piping 54. The slots of the underdrain piping also being upturned to allow partial flooding of the bottom of filter media layer 56. The underdrain piping 54 of each filter layer 28, 30 directs the wastewater into a filter drain pipe 86.

The filter drain pipe 86 leads the filtered wastewater into the recirculation valve 74. The recirculation valve 74 either routes the wastewater back to the recirculation pump chamber 40 or to the dosing pump chamber 44 depending on the level of the wastewater in the recirculation chamber 32. When the level of the wastewater in the recirculation chamber 32 is below a predetermined level, all wastewater flows out of the recirculation valve 74 back into the recirculation pump chamber 40 of the recirculation chamber 32. When the level of the wastewater in the recirculation chamber 32 reaches a predetermined level, a preset amount of the wastewater flows out of the recirculation valve 74 and into the dosing pump chamber 44 of the dosing chamber 34, and a preset amount of the wastewater flows out of the recirculation valve 74 back into the recirculation pump chamber 40 of the recirculation chamber 32. A preferred split in recirculation flows of the recirculation valve 74 is one fifth to the dosing pump chamber 44 and four fifths to the recirculation pump chamber 40. A suitable recirculation valve 74 is a Recirculating Splitter Valve made by Orenco Systems, Inc. of Roseburg, Oreg.

A dosing pump 78 can be located in the dosing pump chamber 44 to pump the treated wastewater out of the wastewater treatment unit 10 through an effluent discharge pipe 88. If the ground level has a favorable slope, the dosing pump 78 is not necessary and gravity can be used to cause the effluent to flow through the effluent discharge pipe 88. The effluent discharge pipe 88 can be connected to various types of discharge systems 92, including a soil absorption field, a subsurface drip irrigation system or surface discharge.

Tracing the flow of wastewater through the wastewater treatment unit 10, primary wastewater effluent from a wastewater source flows through the influent pipe 50 into the recirculation basin 38 in the bottom layer 26 of the treatment unit 10 and becomes influent to the system. The wastewater level throughout the recirculation chamber 32, which includes the recirculation basin 38 and the recirculation pump chamber 40, is kept substantially the same by the connection through the recirculation conduits 46.

The recirculation pump 72 pumps the wastewater from the recirculation chamber 32 through the filter distribution piping 82, automatic distributing device 81, flexible hose connection 57, and filter lateral piping 58 to the filter layers 28, 30. The recirculation pump 72 is activated by a timer in the control panel 14 to control the time dosage of the filter layers 28, 30. The recirculation pump 72, filter distribution piping 82, automatic distributing valve 81, flexible hose connection 57, and filter lateral piping 58 can be designed to time dose all filter layers simultaneously or to time dose different filter layers at different times, alternating between filter layers. The recirculation chamber 32 is sized to buffer high peak flows and to enable the wastewater to make multiple passes through the filter layers. The capacity of the recirculation chamber 32 allows for continual small dose feeding of the filter media 56 during peak flow periods to maintain optimal biological activity in the filter layers. The capacity of the recirculation chamber 32, and design of the recirculation valve 74, provide water storage to allow for continued feeding of the filter media 56 during extended periods of nonuse to maintain the biological activity of the filter layers.

The recirculation pump 72 can also be activated by a high level indicator, such as a float device, of the recirculation basin level control 76. In addition to activating the recirculation pump 72, the recirculation basin level control 76 can also trigger an alarm through the control panel 14 to indicate that the wastewater in the recirculation chamber 32 is exceeding expected levels. The alarm can be audible, visual or notify a responsible party by some other method. In a preferred embodiment, the alarm is part of a control system which is installed in control panel 14, and the control system includes a modem card which can call a series of predefined phone numbers to notify the responsible party of the condition of the wastewater treatment unit 10. A suitable control system and modem is a Tele-controller made by QuadTech, LLC of Norcross, Ga.

The wastewater pumped by the recirculation pump 72 is sprayed over the filter layer by the filter distribution piping 58. The sprayed wastewater is aerated in the air space 60 and flows through the filter media 56 by gravity. A preferred filter media is peat. As the wastewater flows through the filter media 56, it is treated by a combination of physical, chemical and aerobic biological processes. The filtered wastewater of each filter layer eventually flows to the underdrain piping 54 which transports it to the filter drain pipe 86. The filtered wastewater from all of the filter layers is collected in the filter drain pipe 86 and directed to the recirculation valve 74.

The recirculation valve 74 either channels the filtered wastewater to the recirculation chamber 32 or the dosing chamber 34 depending on the level of the wastewater in the recirculation chamber 32. When the level of the wastewater in the recirculation chamber 32 is below a predetermined level, the recirculation valve 74 directs all filtered wastewater back into the recirculation chamber 32 where it mixes with the influent entering the wastewater treatment system 10 through the influent pipe 50. When the level of wastewater in the recirculation chamber 32 reaches a predetermined level, the recirculation valve 74 directs a preset amount of the filtered wastewater into the dosing chamber 34 for final disposal, and returns a preset amount of the filtered wastewater to the recirculation basin 32.

The wastewater treatment unit 10 is preferably sized according to the expected volume of wastewater so that the wastewater is circulated through the filter media 56 of a filter layer multiple times to treat the wastewater to acceptable levels before it is routed to the dosing chamber 34. The filtered wastewater will then exit the wastewater treatment unit 10 through the effluent discharge pipe 88 with or without the use of a dosing pump 78 in the dosing chamber 34.

The dosing chamber 34 can be equipped with the dosing pump 78 depending on the system design and the contour of the ground. If the ground level slopes sufficiently downward and time dosage is not required, gravity can be used to discharge the filtered wastewater from the dosing chamber 34 through the effluent discharge pipe 88. If the ground does not have a sufficient downward slope or the discharge system 92 requires time dosage, the dosing pump 78 can pump the filtered wastewater through the effluent discharge pipe 88. The dosing pump 78 can be activated by a timer in the control panel 14 to control the time dosage of the discharge system 92. When time dosage is required, the dosing chamber 34 can be sized to buffer variations in flow volumes to enable desired discharge dose volumes through the discharge system 92 during both peak and non-peak flow periods. The dosing basin level control 80 can include a low level indicator, such as a float device, to disable activation of the dosing pump 78 if there is insufficient filtered wastewater in the dosing chamber 34. The dosing pump 78 can also be activated by a high level indicator, such as a float device, of the dosing basin level control 80. In addition to activating or disabling the dosing pump 78, the dosing basin level control 78 can also trigger the alarm through the control panel 14 to indicate that the wastewater in the dosing chamber 34 is exceeding or not reaching expected levels. The alarm can be audible, visual, or can notify the responsible party of the condition of the wastewater treatment unit 10 by another method including calling a predefined phone number.

An electronic control and monitoring system controlled through the control panel 14 monitors the depth of the wastewater in the recirculation chamber 32 and the dosing chamber 34, monitors amperage draw by the wastewater treatment unit 10 and also monitors ponding water on the surface of any of the filter media layers 56. The control system can time activate the recirculation pump 72 to time dose each of the filter layers 56 on a periodic basis. The control system can also activate the dosing pump 78 for final wastewater disposal on either a timed or level basis. When the control system senses amperage draw by pump 78, 72 outside of an expected range, or when the control system senses ponding on the surface of any of the filter media layers 56, an alarm can be triggered through the control panel 14 to indicate the sensed condition. The alarm can be audible, visual, or can notify the responsible party of the condition of the unit 10 by calling a predefined phone number. The alarms are preferably distinguishable, so the responsible party can determine what is causing the alarm condition and can take the appropriate action.

The flow of the wastewater through the wastewater treatment unit 10 is used to treat wastewater entering through the influent pipe 50 to acceptable levels before it is discharged through the effluent pipe 88 and fed to the discharge system 92. The wastewater treatment unit 10 is designed to reduce levels of biochemical oxygen demand, total suspended solids, ammonia, nitrates, and pathogens to levels meeting required standards. The wastewater undergoes biochemical oxygen demand, total suspended solids and pathogen reduction as well as nitrification as it passes through the filter media 56. The filter media 56 of each filter layer is well ventilated by the air space 60 so that the filter stays aerobic.

A diverse microflora adhere to the surface of the filter media 56 and degrade and assimilate the carbonaceous element of the wastewater in the upper portions of the filter media 56. Nitrification occurs in the lower portions of the filter media 56. Denitrification begins in the bottom ponded layer of the filter media 56 which is caused by the upturned slots in underdrain piping 54. The filtered wastewater flows through the filter drain pipe 86 and back into the recirculation chamber 32 where it mixes with the influent entering the unit 10 through the influent pipe 50. The influent from the influent pipe 50 acts as a carbon source and denitrification occurs due to the anoxic conditions in the recirculation chamber 32 which reduces the level of nitrates in the wastewater.

While the preferred embodiment of the invention set forth above and shown in the drawings describe the invention with two filter layers 28, 30, those skilled in the art will recognize that more than two filter layers could be used to further reduce the footprint of the treatment unit 10 necessary to treat a given volume of wastewater.

Thus, it will be understood that various modifications can be made to the system disclosed in this application without departing from the spirit and scope of the invention as set forth in the claims attached hereto.

What is claimed is:

1. A wastewater treatment unit, comprising the following:
   a recirculation chamber;
   a dosing chamber having no direct fluid connection to said recirculation chamber; and
   at least two filter layers, each filter layer containing filter media and being located atop said recirculation and dosing chambers; said recirculation chamber, said dosing chamber, and said at least two filter layers being located in a single tank;
   an influent pipe which directs wastewater entering said wastewater treatment unit into said recirculation chamber;
   a recirculation pump located in said recirculation chamber, said recirculation pump pumping the wastewater from said recirculation chamber onto said filter layers;
   a recirculation valve, the wastewater flowing through said filter media of said filter layers being directed to said recirculation valve, said recirculation valve directing the wastewater to one of said recirculation chamber and said dosing chamber; and
   an effluent discharge pipe connected to said dosing chamber, the wastewater being discharged from said wastewater treatment unit through said effluent discharge pipe.

2. The wastewater treatment unit as recited in claim 1, wherein said recirculation valve directs the wastewater to said recirculation chamber when the level of wastewater in said recirculation chamber is below a predetermined level, and said recirculation valve directs the wastewater to said recirculation and dosing chambers when the level of wastewater in said recirculation chamber is at or above said predetermined level.

3. The wastewater treatment unit as recited in claim 2, wherein, when the level of wastewater in said recirculation chamber is at or above said predetermined level, said recirculation valve directs about four-fifths of the wastewater to said recirculation chamber and about one-fifth of the wastewater to said dosing chamber.

4. The wastewater treatment unit as recited in claim 1, further comprising a vent pipe having an outside vent opening open to the atmosphere, and a layer opening at each of said filter layers.

5. The wastewater treatment unit as recited in claim 1, further comprising a filter distribution and lateral piping assembly for each filter layer, said recirculation pump pumping the wastewater onto said filter media of each of said filter layers through said filter distribution and lateral piping assembly.

6. The wastewater treatment unit as recited in claim 5, further comprising a vent pipe having an outside vent opening open to the atmosphere, and an opening at each filter layer creating an air space above said filter media of each filter layer, wherein the wastewater pumped through said filter distribution piping assembly of each filter layer is sprayed into said air space of each filter layer.

7. The wastewater treatment unit as recited in claim 1, further comprising an underdrain piping assembly for each filter layer, the wastewater flowing through said filter media of each of said filter layers being directed into said underdrain piping assembly which directs the wastewater to said recirculation valve.

8. The wastewater treatment unit as recited in claim 1, further comprising a filter layer floor for each filter layer, said filter layer floor being removable.

9. The wastewater treatment unit as recited in claim 1, further comprising a dosing pump located in said dosing chamber, said dosing pump pumping the wastewater from said dosing chamber through said effluent discharge pipe.

10. The wastewater treatment unit as recited in claim 9, further comprising a dosing basin level control, said dosing basin level control activating said dosing pump when the level of wastewater in said dosing chamber reaches a predetermined dosing pump activation level.

11. The wastewater treatment unit as recited in claim 10, further comprising a dosing pump timer; said dosing pump timer periodically activating said dosing pump, said dosing basin level control disabling activation of said dosing pump when the level of wastewater in said dosing chamber is below a predetermined dosing chamber minimum level.

12. The wastewater treatment unit as recited in claim 9, further comprising a control system having an alarm, said control system monitoring amperage draw by said recirculation pump and said dosing pump, said control system being preset with an acceptable range for said amperage draw, said control system triggering said alarm when said amperage draw goes outside of said acceptable range for said amperage draw.

13. The wastewater treatment unit as recited in claim 1, further comprising a recirculation pump timer, said recirculation pump timer periodically activating said recirculation pump.

14. The wastewater treatment unit as recited in claim 13, further comprising a recirculation basin level control, said recirculation basin level control activating said recirculation pump when the level of wastewater in said recirculation chamber reaches a predetermined recirculation chamber maximum level.

15. The wastewater treatment unit as recited in claim 1, wherein said recirculation chamber includes a recirculation basin and a recirculation pump chamber, said recirculation basin and said recirculation pump chamber being connected by a recirculation conduit.

16. The wastewater treatment unit as recited in claim 1, wherein said dosing chamber includes a dosing basin and a dosing pump chamber, said dosing basin and said dosing pump chamber being connected by a dosing conduit.

17. The wastewater treatment unit as recited in claim 1, further comprising a control system having an alarm, said control system monitoring ponding of water on said filter media of each of said filter layers, said control system triggering said alarm when ponding of water is detected on said filter media of any of said filter layers.

18. A wastewater treatment unit, comprising the following:
   a recirculation chamber;
   a dosing chamber having no direct fluid connection to said recirculation chamber; and
   at least two filter layers containing filter media, each filter layer having an air space and being located atop said recirculation and dosing chambers; said recirculation chamber, said dosing chamber, and said at least two filter layers being located in a single tank;
   an influent pipe which directs wastewater entering said wastewater treatment unit into said recirculation chamber;
   a recirculation pump which pumps the wastewater from said recirculation chamber onto said filter layers;
   a vent pipe having an outside vent opening open to the atmosphere, and an opening at each of said filter layers open to said air space of each filter layer;
   a recirculation valve, the wastewater flowing through said filter layers to said recirculation valve, said recirculation valve directing the wastewater to said recirculation chamber when the level of wastewater in said recirculation chamber is below a predetermined recirculation chamber level, and said recirculation valve directing the wastewater to said recirculation and dosing chambers when the level of wastewater in said recirculation chamber is at or above said predetermined recirculation chamber level; and
   an effluent discharge pipe connected to said dosing chamber, the wastewater being discharged from said wastewater treatment unit through said effluent discharge pipe.

19. The wastewater treatment unit as recited in claim 18, further comprising:
   a filter distribution piping assembly for each filter layer, said recirculation pump pumping the wastewater through said filter distribution piping assembly, and spraying the wastewater from said filter distribution piping assembly into said air space of each filter layer;
   an underdrain piping assembly for each filter layer, the wastewater flowing through said filter media of each of said filter layers into said underdrain piping assembly which directs the wastewater to said recirculation valve; and
   a filter layer floor for each filter layer located above another filter layer, each said filter layer floor being removable.

20. The wastewater treatment unit as recited in claim 19, further comprising a control system including a recirculation basin level control, a recirculation pump timer and a recirculation chamber level alarm; said recirculation pump being activated periodically by said recirculation pump timer; said recirculation pump being activated and said recirculation chamber level alarm being triggered by said recirculation basin level control when the level of wastewater in said recirculation chamber reaches a predetermined recirculation pump maximum level.

21. The wastewater treatment unit as recited in claim 19, further comprising a dosing pump located in said dosing chamber, said dosing pump pumping the wastewater from said dosing chamber through said effluent discharge pipe.

22. The wastewater treatment unit as recited in claim 21, further comprising a control system including a recirculation basin level control, a dosing basin level control, a recirculation pump timer, a dosing pump timer, a recirculation chamber level alarm, and a dosing chamber level alarm; said recirculation pump timer periodically activating said recirculation pump; said recirculation basin level control activating said recirculation pump and said recirculation chamber level alarm when the level of wastewater in said recirculation chamber reaches a predetermined recirculation chamber maximum level; said dosing pump timer periodically activating said dosing pump; said dosing basin level control activating said dosing pump when the level of wastewater in said dosing chamber reaches a predetermined dosing pump activation level; said dosing basin level control activating said dosing chamber level alarm when the level of wastewater in said dosing chamber reaches a predetermined dosing chamber maximum level; said dosing basin level control disabling activation of said dosing pump by said dosing pump timer when the level of wastewater in said dosing chamber is below a predetermined dosing pump minimum level.

23. The wastewater treatment unit as recited in claim 22, wherein said control system includes an over-amperage alarm and a ponding alarm; said control system monitoring amperage draw by said recirculation pump and said dosing pump, said control system being preset with an acceptable range for said amperage draw, said control system activating said over-amperage alarm when said amperage draw goes outside of said acceptable range for said amperage draw; said control system monitoring ponding of water on said filter media of each of said filter layers, said control system activating said ponding alarm when ponding of water is detected on said filter media of any of said filter layers.

24. The wastewater treatment unit as recited in claim 22, wherein said control system includes a modem card, said modem card being activated by at least one of said recirculation chamber level alarm and said dosing chamber level alarm; said modem card, when activated, initiating a call to preset phone numbers to notify a responsible person of at least one of said recirculation chamber level alarm and said dosing chamber level alarm.

* * * * *